(12) United States Patent
Yi et al.

(10) Patent No.: US 7,827,037 B2
(45) Date of Patent: Nov. 2, 2010

(54) SYSTEM, METHOD AND APPARATUS FOR PROVIDING FEED TOXIN INFORMATION AND RECOMMENDATIONS

(75) Inventors: James Z. Yi, Eden Prairie, MN (US); Gary D. Fisher, Anoka, MN (US); Frank Yin, Plymouth, MN (US); William Michael Craig, Monticello, MN (US)

(73) Assignee: CAN Technologies, Inc., Minnetonka, MN (US)

( * ) Notice: Subject to any disclaimer, the term of this patent is extended or adjusted under 35 U.S.C. 154(b) by 871 days.

(21) Appl. No.: 10/170,241

(22) Filed: Jun. 11, 2002

(65) Prior Publication Data

US 2003/0229505 A1    Dec. 11, 2003

(51) Int. Cl.
*G06Q 99/00*    (2006.01)

(52) U.S. Cl. .................................................. 705/1.1

(58) Field of Classification Search ................... 705/1
See application file for complete search history.

(56) References Cited

U.S. PATENT DOCUMENTS

| | | | |
|---|---|---|---|
| 4,055,674 A | 10/1977 | Yano et al. | 426/430 |
| 4,314,027 A * | 2/1982 | Stahr | 435/34 |
| 4,795,651 A | 1/1989 | Henderson et al. | 426/456 |
| 5,082,679 A | 1/1992 | Chapman | 426/312 |
| 5,165,946 A | 11/1992 | Taylor et al. | 426/74 |
| 5,178,832 A | 1/1993 | Phillips et al. | 422/60 |
| 5,299,121 A * | 3/1994 | Brill et al. | 600/301 |
| 5,478,990 A * | 12/1995 | Montanari et al. | 235/375 |
| 5,498,431 A | 3/1996 | Lindner | 426/238 |
| 5,598,770 A * | 2/1997 | Campbell et al. | 99/487 |
| 6,045,834 A | 4/2000 | Howes et al. | 426/2 |
| 6,058,940 A | 5/2000 | Lane | 131/298 |
| 6,370,513 B1 | 4/2002 | Kolawa et al. | |
| 6,375,077 B1 * | 4/2002 | Hankins | 235/462.45 |
| 6,532,420 B1 * | 3/2003 | Haeffner et al. | 702/22 |
| 6,745,131 B2 * | 6/2004 | Haeffner et al. | 702/22 |
| 6,907,351 B2 * | 6/2005 | Julia et al. | 702/23 |
| 2002/0004749 A1 * | 1/2002 | Froseth et al. | 705/16 |
| 2002/0049643 A1 * | 4/2002 | Church | 705/26 |
| 2002/0059175 A1 * | 5/2002 | Nakano | 707/1 |
| 2002/0129004 A1 * | 9/2002 | Bassett et al. | 707/1 |
| 2002/0157411 A1 * | 10/2002 | Ishikawa et al. | 62/231 |
| 2002/0174096 A1 * | 11/2002 | O'Reilly et al. | 707/1 |
| 2005/0126500 A1 * | 6/2005 | Burghardi et al. | 119/51.01 |

FOREIGN PATENT DOCUMENTS

GB    2367911 A  *  4/2002

(Continued)

OTHER PUBLICATIONS www.ecFood.com.*

(Continued)

Primary Examiner—Jonathan Ouellette

(57) ABSTRACT

A method for providing toxin information and recommendations includes receiving toxin content data for at least one ingredient. The toxin content data may include the type and amount for toxins found in the ingredient. The ingredient is classified based on the toxin content data and a predetermined allowable toxin amount for the ingredient. Based on the classification of the ingredient, ingredient storage information is displayed. In addition, ingredient use information may be displayed based on the toxin content data.

41 Claims, 18 Drawing Sheets

FOREIGN PATENT DOCUMENTS

WO    WO 0118196 A1 *  3/2001

OTHER PUBLICATIONS www.IngredientsNet.com.*

"Technology, Services & Instrumentation." Prepared Foods, Aug. 2000.*

"Rooster.com (SM) Announces ADM as a Strategic Investor in Electronic Agricultural Marketplace." PR Newswire, Aug. 2, 2000.*

"Ireland: Butter and cream to be tested for toxin." Irish Times, Mar. 12, 2002.*

Jones, Frank T., "Control of toxic substances." Feedstuffs, v74, n28, p. 63(5), Jul. 10, 2002.*

Whitlow, Lw.; Hagler, W.M., Jr., "Mycotoxins in feeds."Feedstuffs, v74, n28, p. 66(11), Jul. 10, 2002.* www.inspection.gc.ca, retrieved from Internet Archive Wayback Machine <www.archive.org>, date range: Jun. 18-Jul. 20, 2001.* www.saltbush.une.edu.au, retrieved from Internet Archive Wayback Machine <www.archive.org>, date range: Feb. 2-Mar. 2, 2001.*

"Aquaculture Development. 1. Good Aquaculture Feed Manufacturing Practice," Food and Agriculture Organization of the United Nations, 2001, retrieved from the Internet <www.fao.org.DOCREP/005/Y1453/y1453e00.htm>.*

McIlmoyle, Alan, "Safe Animal Feed and the use of HACCP in the Animal Feed Industry," Animal Nutrition & Agricultural Consultants, 2000, retrieved from the Internet <http://agrifor.ac.uk/whatsnew/detail/1090603.html>.* www.anac-anac.ca, retrieved from Internet Archive Wayback Machine <www.archive.org>.* www.asc-mixit.com/software.htm, retrieved from Internet Archive Wayback Machine <www.archive.org>.* www.ifama.org/conferences/2001Conference/ForumPresentations/Johson_Ray.PDF, retrieved from Internet Archive Wayback Machine <www.archive.org>.*

Jones, Frank T., "Quality control in feed manufacturing." Feedstuffs, v72, n29, p. 85, Jul. 13, 2000.*

Mitchell, Bob, "How to HACCP," British Food Journal, v94n1, pp. 16-20, 1992.*

Bennet, William L; Steed, Leonard L, "An integrated approach to food safety," Quality Progress, v32n2, pp. 37-42, Feb. 1999.* www.formatinternational.com, Retrieved from Internet Archive WayBack Machine <www.archive.org>, Date Range: May 15-Aug. 30, 2001.*

Dudley-Cash, Dr. William A. "Effective quality control program is a needed business investment." Feedstuffs, v74, n18, p. 10, May 6, 2002.*

"Integrated Mycotoxin Management Systems"; Garcia et al., Food, Nutrition & Agriculture 23; 17-pg. document; [located online at http://www.fao.org/docrep/x2100t/x2100t07.htm].

"Grain Storage Techniques—Evolution and Trends in Developing Countries"; FAO Agricultural Services; Bulletin No. 109; [located online at http://www.fao.org/docrep/T1838E/T1838E00.htm].

Abstract of ACIAR 1997 Postharvest Technology Conference; [located online at http://www.aciar.gov.au/projects/postharvest/97017.htm].

PCT International Search Report, PCT/US03/11054 (3 pgs.), Aug. 12, 2003.

Jones, F.T., "Control of toxic substances", Feedstuffs, Jul. 10, 2002, vol. 74, No. 28; p. 63(5).

Whitlow, L.W., and Hagler, W.M., "Mycotoxins in feeds", Feedstuffs, Jul. 10, 2002, vol. 74, No. 28, p. 68(11).

* cited by examiner

SYSTEM, METHOD AND APPARATUS FOR PROVIDING FEED TOXIN INFORMATION AND RECOMMENDATIONS

FIELD OF THE INVENTION

The present invention relates to systems, methods and apparatus for providing information and recommendations regarding feed production, in particular, regarding toxins present in feed and feed ingredients.

BACKGROUND OF THE INVENTION

A major problem faced in feed production is the presence of substances in the feed ingredients and feed that affect the safety and performance (e.g., nutrient performance) of the feed. In particular, molds and other toxins have caused serious problems in feed ingredients and ultimately the feed mixture. Under certain conditions during both growth and storage, molds will grow in feed ingredients and feed mixtures. In addition, certain types of mold produce chemical compounds known as mycotoxins that may be toxic to both animals and humans. Examples of molds known to produce mycotoxins are penicillium, aspergillus and fusarium. Some of the most common mycotoxins are aflatoxin, deoxynivalenol (DON), zearalenone (ZEN), fumonisin, ochratoxin (OA) and the T-2 toxin). Diseases in human beings and animals resulting from the consumption of mycotoxins are known as mycotoxicoses. Molds and mycotoxins may also result in decreased nutrient performance in feed and decreased animal performance.

Prior attempts have been made in the feed industry to control and prevent mold growth and mycotoxin production in feed ingredients and feed mixtures. For example, mold inhibitors may be added to the feed ingredients or the feed mixture to control mold growth and prevent the production of mycotoxins. However, current toxin management practices have significant drawbacks, for example, current practices are often inefficient, difficult to use and/or do not address potential toxin problems at each stage of the feed production process. In addition, management of the toxin risks for feed ingredients and the manufacture of feed requires knowledge of a number of different areas. The knowledge required can make the process complicated and decisions regarding the appropriate steps to manage the toxin risk difficult. An improved system which overcomes one or more of these problems is needed.

SUMMARY OF THE INVENTION

In accordance with one aspect of the invention, a method for providing toxin information regarding ingredients used in feed to a user includes receiving toxin content data for at least one ingredient. The toxin content data includes a type and an amount for toxins in the at least one ingredient. The method further includes classifying the at least one ingredient based on the toxin content data and a predetermined allowable toxin amount and displaying ingredient storage information regarding the at least one ingredient. In another embodiment, the method includes providing ingredient use information regarding the at least one ingredient.

In accordance with another aspect of the invention, a method of providing recommendations regarding ingredients used in feed to a user includes displaying steps of a decision process to the user, receiving operator inputs including those pertaining to toxin content of the set of ingredients in response to questions asked in the steps of the decision process, processing the operator inputs in accordance with stored decision logic, and providing the recommendations to the user based on the receiving and processing steps.

In accordance with another aspect of the invention, a computer user interface that provides access to a toxin management system for providing toxin information regarding ingredients used in feed to a user includes a purchasing interface including a display region that displays a predetermined allowable toxin amount for at least one ingredient; a testing interface, coupled to the purchasing interface, including a display region that displays a set of toxins to test for in the at least one ingredient, a display region that notifies the user of a test type associated with the set of toxins, and a display region that displays a set of toxin content data for the at least one ingredient; and a classification interface, coupled to the purchasing and testing interface, including a display region that displays a classification for the at least one ingredient. The computer user interface may further include a storage interface, coupled to the classification interface, including a display region that displays ingredient storage information for the at least one ingredient or a formulation interface, coupled to the classification interface, including a display region that displays ingredient use information for the at least one ingredient, or a combination of these.

In accordance with yet another aspect of the invention, a computer program product for providing toxin information regarding ingredients used in feed to a user includes computer readable program code for receiving toxin content data for at least one ingredient. The toxin content data includes a type and an amount of toxins in the at least one ingredient. The computer program product also includes program code for classifying the at least one ingredient based on the toxin content data and a predetermined allowable toxin amount; program code for displaying storage information regarding the at least one ingredient; and program code for displaying ingredient use information regarding the at least one ingredient.

In accordance with yet another aspect of the invention, an apparatus for providing toxin information regarding ingredients used in feed to a user includes purchasing logic that receives a predetermined allowable toxin amount for at least one ingredient and testing logic, coupled to the purchasing logic, that receives a set of toxin content data for the at least one ingredient. The toxin content data includes a type and an amount for a set of toxins in the at least one ingredient. The apparatus further includes classification logic, coupled to the purchasing logic and testing logic, that classifies the at least one ingredient based on the toxin content data and the predetermined allowable toxin amount for the at least one ingredient, storage logic, coupled to the classification logic, that displays ingredient storage information regarding the at least one ingredient, and formulation logic, coupled to the testing logic and the classification logic, that displays ingredient use information regarding the at least one ingredient.

In accordance with yet another aspect of the invention, a method of manufacturing feed includes processing feed ingredients in accordance with recommendations provided by a computer-implemented best practices feed management tool and mixing the feed ingredients to produce the feed. In one embodiment, the best practices feed management tool comprises a plurality of decision processes, wherein the recommendations are provided by the feed management tool as outputs of the plurality of decision making processes, and wherein the method further comprises accessing the plurality of decision making processes to receive the recommendations provided as outputs of the plurality of decision making processes.

In accordance with yet another aspect of the invention, a system for providing toxin information regarding ingredients used in feed to a user, includes a first process, running on a host computer, the first process for receiving a set of toxin content data for at least one ingredient, the toxin content data including a type and an amount for a set of toxins in the at least one ingredient. The system further includes a second process, running on the host computer, the second process for classifying the at least one ingredient based on the toxin content data and a predetermined allowable toxin amount for the at least one ingredient, a third process, running on the host computer, the third process for displaying ingredient storage information regarding the at least one ingredient based on the classification of the ingredient, and a fourth process, running on the host computer, the fourth process for displaying ingredient use information regarding the at least one ingredient based on the toxin content data for the at least one ingredient.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENTS

The methods, apparatus and system described herein may be implemented using computer software, firmware, hardware or a combination of these. In particular, it is anticipated that the methods described herein may be embodied in software stored such as on a computer hard drive, a floppy disk, CD, DVD or other storage medium. For example, a computer device can be loaded with software instructions to implement the structure and processes of the method, system and apparatus described herein. The software may be standard software used by those skilled in the art or may be coded in any standard programming language to accomplish the tasks detailed below. In other embodiments, a user may access the methods, apparatus and system via a remote computer in communication over a network, such as the World Wide Web, with a host computer.

One strategy used to manage risks present in a system or process as well as to provide quality control is to use a best management practices tool. Typically best practices are procedures developed for an individual(s) to follow to ensure quality and predictability in the process. An organization may put the procedures of a best practices tool in place to ensure that a certain process or procedure maintains a high quality and predictable results.

Figure 1:
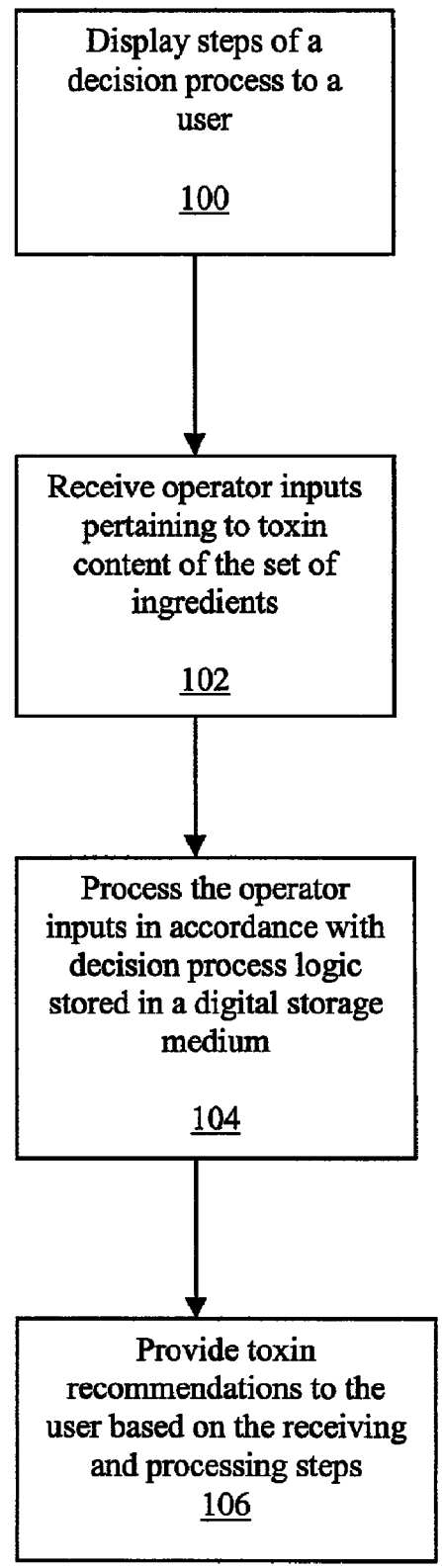
FIG. 1 illustrates a method for providing toxin information and recommendations regarding ingredients used in feed in accordance with an embodiment of the invention.

FIG. 1 illustrates a method for providing toxin information and recommendations regarding a set of ingredients used in feed in accordance with one preferred embodiment. The toxin information and recommendations are preferably used to assist in the risk management of toxins present in feed and feed ingredients. While the invention will be described below generally with reference to mycotoxins, it is to be understood that the management of other toxins and substances present in feed and feed ingredients may similarly benefit from various embodiments and improvements which are subjects of the present invention. The steps of the methods and processes described herein are not necessarily performed in the order shown in the accompanying drawings, for example, some steps could be performed at the same time rather than sequentially or some steps could be performed out of sequence.

At block 100, the steps of a decision process are displayed to a user. The decision process may be, for example, a set of decision trees regarding various points in feed production where toxins in feed and feed ingredients may be evaluated and controlled. During the feed production process, it is advantageous to take steps to control mold growth and mycotoxin production. As discussed previously, mycotoxins may be toxic to both animals and humans and affect both the nutrient performance and animal performance of a feed. At block 102, operator inputs are received that pertain to toxin content data for the set of ingredients. The toxin content data may be determined by testing a particular feed ingredient or feed mixture at a feed plant or off-site facility to determine, for example, the type and amount of toxins contained in the ingredients. Alternatively, test results from the supplier of the feed or feed ingredient may be used to provide the toxin content data. The toxin content data may alternatively include data regarding other factors that are indicative of the risk of mycotoxin development such as mold counts, chitin content and ergosterol content. The operator inputs may also include information on the maximum allowable levels of mycotoxins in particular ingredients and/or feed mixtures as well as the predetermined acceptable mycotoxin levels for purchase of the ingredient or feed. The acceptable purchasing mycotoxin levels may be based on standards as set by governments and industry organizations or may be set by the particular company or feed mill involved in the purchase of the feed ingredient or feed.

Once the operator inputs are received, decision process logic is used to process the operator inputs at block 104 in order to provide both toxin information and recommendations. The decision process logic may be stored in a digital storage medium. Based on the processing of the operator inputs, the user is provided with recommendations regarding various issues at block 106 including the storage and use of the feed ingredient or feed. The information and recommendations provided may include, for example, which additives (e.g., inhibitors, binders, etc.) could be used with the ingredient to counteract the presence of molds and mycotoxins, proper storage conditions for an ingredient or a feed incorporating the ingredient to prevent further mold growth and mycotoxin production, formulas for feed incorporating the feed ingredient and the type of feed in which the ingredient should be included, which may be based on, for example, the sensitivity of a particular animal species to a particular mycotoxin and the amount of mycotoxins present in the ingredient.

Figure 2:
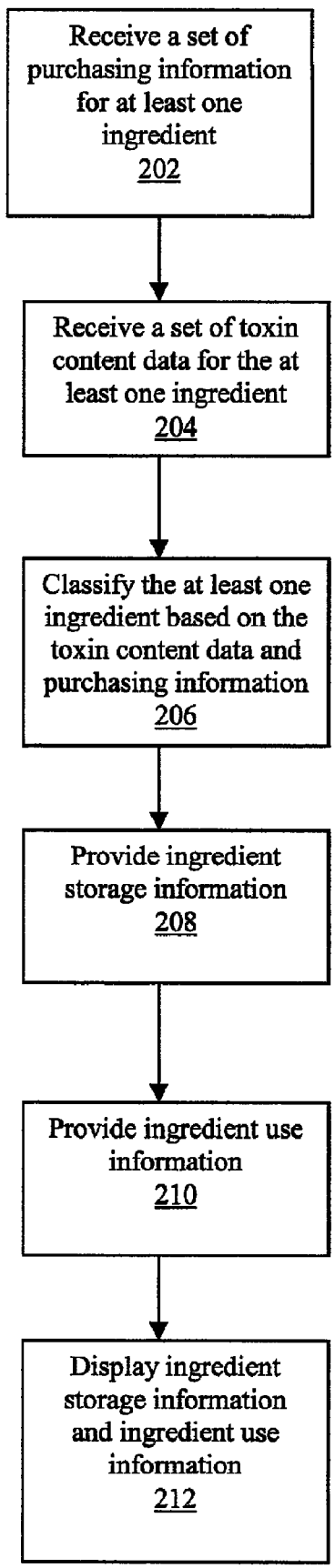
FIG. 2 illustrates a method for providing toxin information and recommendations regarding ingredients used in feed in accordance with an alternative embodiment of the invention.

FIG. 2 illustrates a method for providing toxin information and recommendations regarding ingredients used in feed in accordance with an alternative embodiment of the invention. At block 202, purchasing information for at least one ingredient is received by the system. The purchasing information may be provided by the user or stored in a database accessible by the user. The user may determine the purchasing information by accessing the database, by conducting research or by contacting a resource. Any purchasing information provided by the user from research or other resources may be stored in a database so it may be accessed by other users. The purchasing information may include information regarding, for example, the allowable toxin levels for a particular feed ingredient or feed mixture. As discussed above with respect FIG. 1, the allowable toxin levels may be based on standards as set by governments and industry organizations or may be set by the particular company or feed mill involved in the purchase of the feed ingredient or feed. This information may be used to determine whether to purchase a particular ingredient or feed.

Figure 3A:
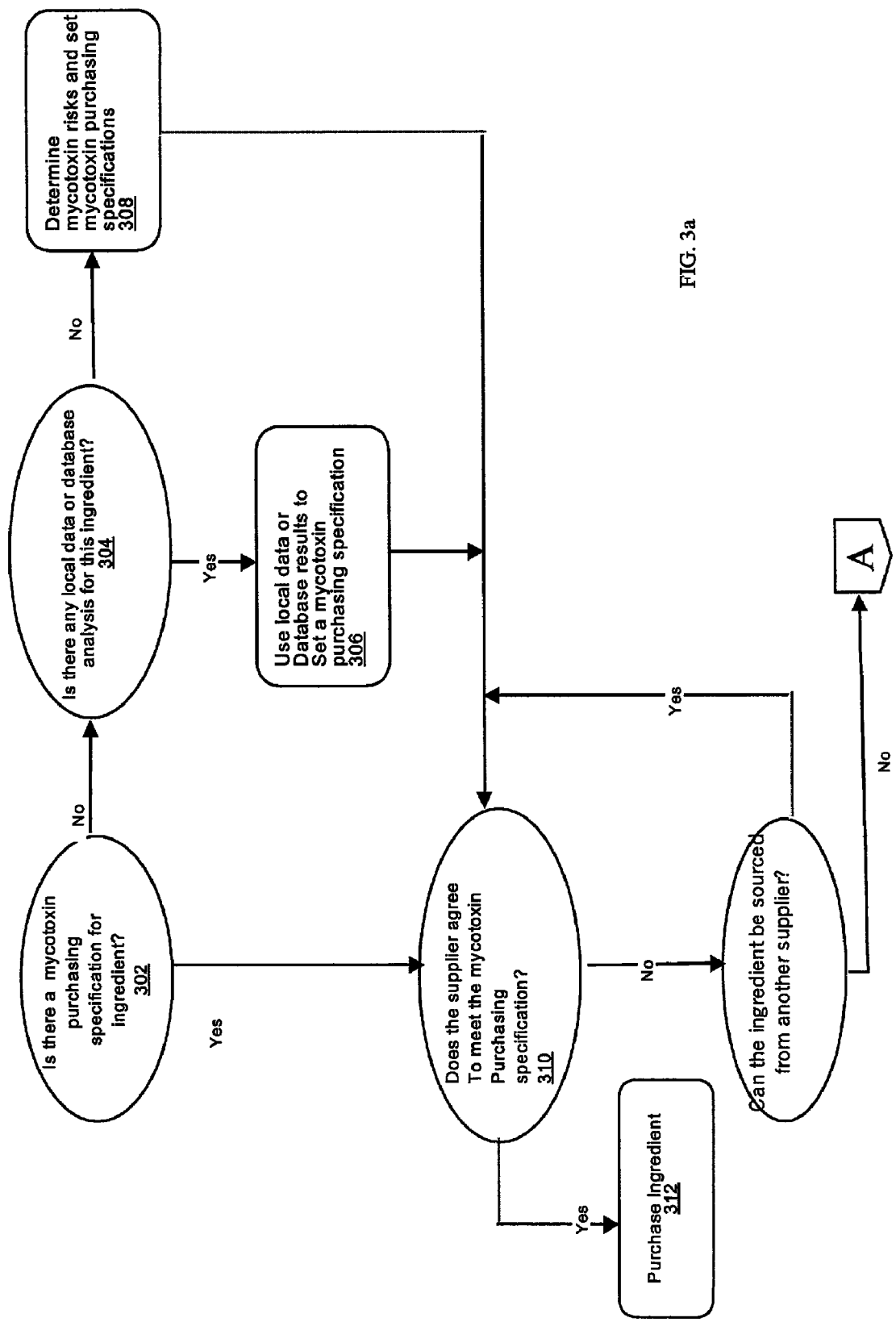
FIGS. 3a and 3b illustrate a purchasing decision process in accordance with an embodiment of the invention.
Figure 3B:
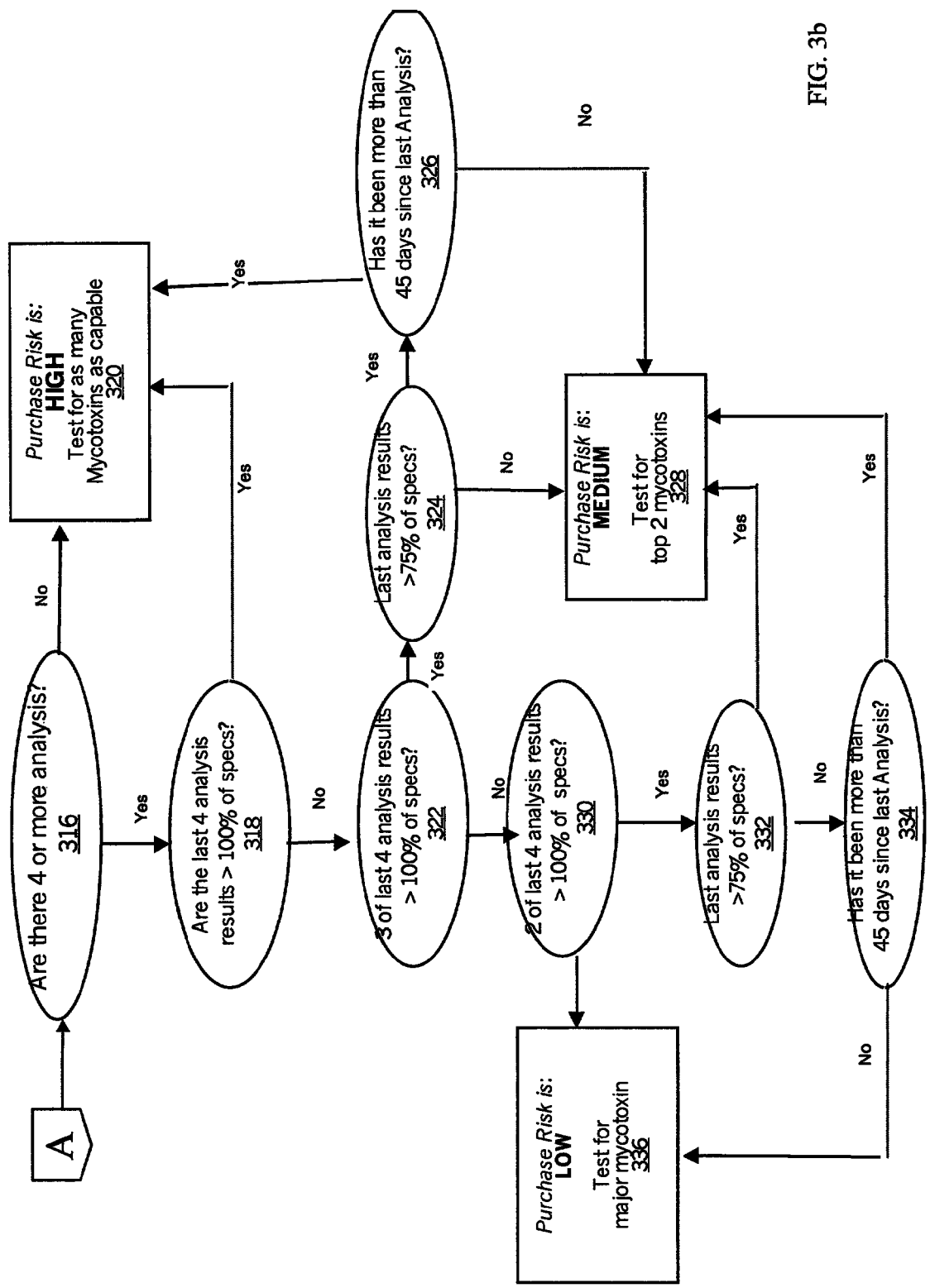

An exemplary purchasing decision process is shown in more detail in FIGS. 3a and 3b. In FIG. 3a, the user determines whether there is existing mycotoxin purchasing information for the particular ingredient at block 302. The user may access a database of purchasing information. The purchasing information may include, for example, the allowable toxin levels for a particular feed ingredient or feed mixture. The purchasing information may be based on industry standards or the standards as established by a particular feed manufacturer. If there is no known purchasing information (either known by the user or stored in a database accessible to the user), at block 304 any analysis data available regarding the particular ingredient may be used to set the purchasing information at block 306. If there is no analysis data available, the user must access other resources to set the purchasing information for the particular ingredient or ingredients at block 308. The other resources may be reference material or individuals with expertise in the area. Any purchasing information located by the user may be stored in the database so it may be available to other users.

Once the purchasing information is known, at block 310 it is determined whether the supplier of the particular ingredient or feed has agreed to meet the allowable toxin levels included in the purchasing information. If the supplier has agreed, the ingredient may be purchased at block 312. If the supplier has not agreed to meet the allowable toxin levels, it is determined at block 314 whether another supplier may be used to supply the ingredient. If there is another supplier, it is again determined whether the supplier will meet any toxin levels requirements provided in the purchasing information. If there is not a supplier that will meet the given requirements, a risk level will be assigned to the ingredient as shown in FIG. 3b. The risk level is used to determine the number and type of toxins to test for in the particular ingredient.

At block 316, if the ingredient has been analyzed (or tested) for toxins four or more times, it is determined whether the last four analysis results are greater than a first given percentage of the allowable toxin level from the purchasing information at block 318. In the example shown in FIG. 3b, the first given percentage is 100%. If the analysis results are greater than the first given percentage of the allowable toxin level or if there have not been four or more prior analyses, the risk level is assigned as high at block 320. If the risk level is high, the ingredient should be tested for as many mycotoxins as possible. If only three of the last four analysis results are greater than the first given percentage of the maximum allowable toxin level at block 322, it is determined whether the last analysis results were greater than a second given percentage of the maximum allowable toxin level at block 324. Typically, the second given percentage will be lower than the first given percentage. In the example shown in FIG. 3b, the second given percentage is 75%. If the last analysis results are greater than the second given percentage of the maximum allowable toxin level and it has not been more than 45 days since the last analysis (block 326), the purchase risk is assigned as medium at block 328. If the purchase risk is medium, the ingredient should be tested for the top two mycotoxins for the particular ingredient. If it has been more than 45 days since the last analysis at block 326, the purchase risk is assigned as high at block 320.

block 324, if the last analysis results are not greater than the second given percentage of the maximum allowable toxin level, the purchase risk is assigned as medium. If only two of the last four analysis results are greater than the first given percentage of the maximum allowable toxin level at block 330, it is determined at block 332 whether the last analysis results are greater than the second given percentage of the maximum allowable toxin level. If the last analysis results are greater than of the second given percentage of the maximum allowable toxin level or if is has been more than 45 days since the last analysis at block 334, then the purchase risk is assigned as medium at block 328. If it has been less than 45 days since the last analysis at block 334, then the purchase risk is assigned as low at block 336. If the purchase risk is low, the ingredient should be tested for the major mycotoxin for the particular ingredient. At block 330, if two of the last four analysis results are less than the first given percentage of the maximum allowable toxin level, the purchase risk is assigned as low at block 336. Information regarding the major (or most common) mycotoxins associated with a particular ingredient may be stored in a database accessible to the user.

Returning to FIG. 2, at block 204, a set of toxin content data is received for the at least one ingredient. The toxin content data may include the type and amount of toxins present in the ingredient. Alternatively, the toxin content data may include data regarding other factors that are indicative of the risk of mycotoxin development such as mold counts, chitin content and ergosterol content. The toxin content data for an ingredient is determined by sampling and testing a portion of the ingredient lot to determine the toxins present in the ingredient. There are many sampling methods known in the art which can be used to obtain accurate test results and analysis. The frequency of testing for a particular ingredient, for example, while the ingredient is being stored, may be based on several factors such as the conditions of the storage facility (e.g., temperature, humidity, etc.) and the type of ingredient.

Figure 4:
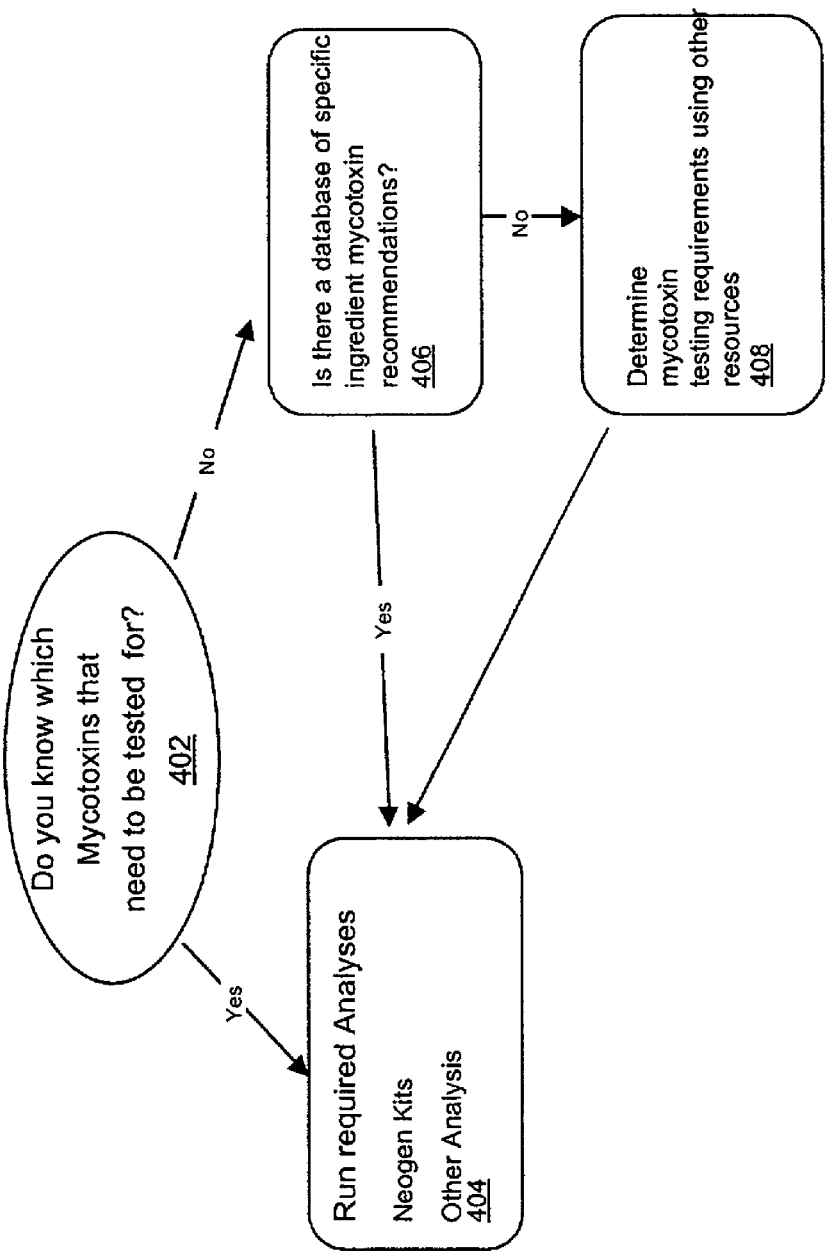
FIG. 4 illustrates a testing decision process in accordance with an embodiment of the invention.

An exemplary testing process is shown in more detail in FIG. 4. At block 402, the mycotoxins for which the ingredient should be tested are determined. The number and type of mycotoxins may be known from the purchasing decision process as described above with respect to FIGS. 3a and 3b. As described above with respect to FIG. 3b, the ingredient may be given a risk level, which is used to identify the number and type of mycotoxins. If the mycotoxins for which the ingredient should be tested are not known, at block 406 the user may access a database of ingredient-specific mycotoxins. Information regarding the major (or most common) mycotoxins associated with a particular ingredient may be stored in a database accessible to the user. In another embodiment, information regarding the recommended frequency of analysis is also included in the database of stored information. In a further embodiment, the database of information includes information on the additive effects of the presence of several toxins. If the information for the particular ingredient is not available in the database, at block 408 the user will need to employ other resources to determine the mycotoxins for which the ingredient should be tested. The information acquired by the user may then be stored in the database of ingredient specific mycotoxins for access by other users.

Once the mycotoxins for which the ingredient should be tested are known, the appropriate test(s) should be performed on the ingredient sample. A database of recommended testing procedures for various mycotoxins may be accessed by the user at block 404. In addition, then database may include recommended testing kits. There are many mycotoxin testing procedures known in the art. Physiochemical methods include, for example, thin layer chromatography (TLC), high performance liquid chromatography (HPLC), gas-liquid chromatography (GLC) and immuno-affinity columns. Bio-assay systems include enzyme-linked immuno-sorbent assay (ELISA). Most of the testing procedures require an extraction procedure to separate the mycotoxins from other components of the sample matrix for testing.

Many ELISA testing kits have been developed for the detection and quantification of mycotoxins, in particular, for those mycotoxins that are common to feed plants and feed production. ELISA testing kits are the most commonly used testing kits in the industry. There are also test kits available that use TLC or immuno-affinity columns procedures. Several types of testing kits test for multiple mycotoxins (TLC), while other testing kits require a separate kit for each mycotoxin (immunochemical kits). The testing and analysis may performed by the feed plant that has purchased the feed or feed ingredient and the tests may be performed on-site for efficiency. Alternatively, the testing and analysis may be performed off-site. Indirect methods for detecting the presence of substances contained in the ingredient include infrared spectroscopy and black light. In a further embodiment, test results for the ingredient may be provided directly by the ingredient supplier.

Returning to FIG. 2, once the toxin content data has been received, the ingredient or feed is classified based on the toxin content data and the purchasing information, in particular, the maximum allowable toxin level for the particular ingredient. The classification may be used to identify ingredient storage information, e.g. the ways in which the ingredient received by the feed plant should be stored and used, including providing additives, as discussed further below. Proper storage of an ingredient or feed can reduce the possibility of continued mold growth and mycotoxin production.

Figure 5:
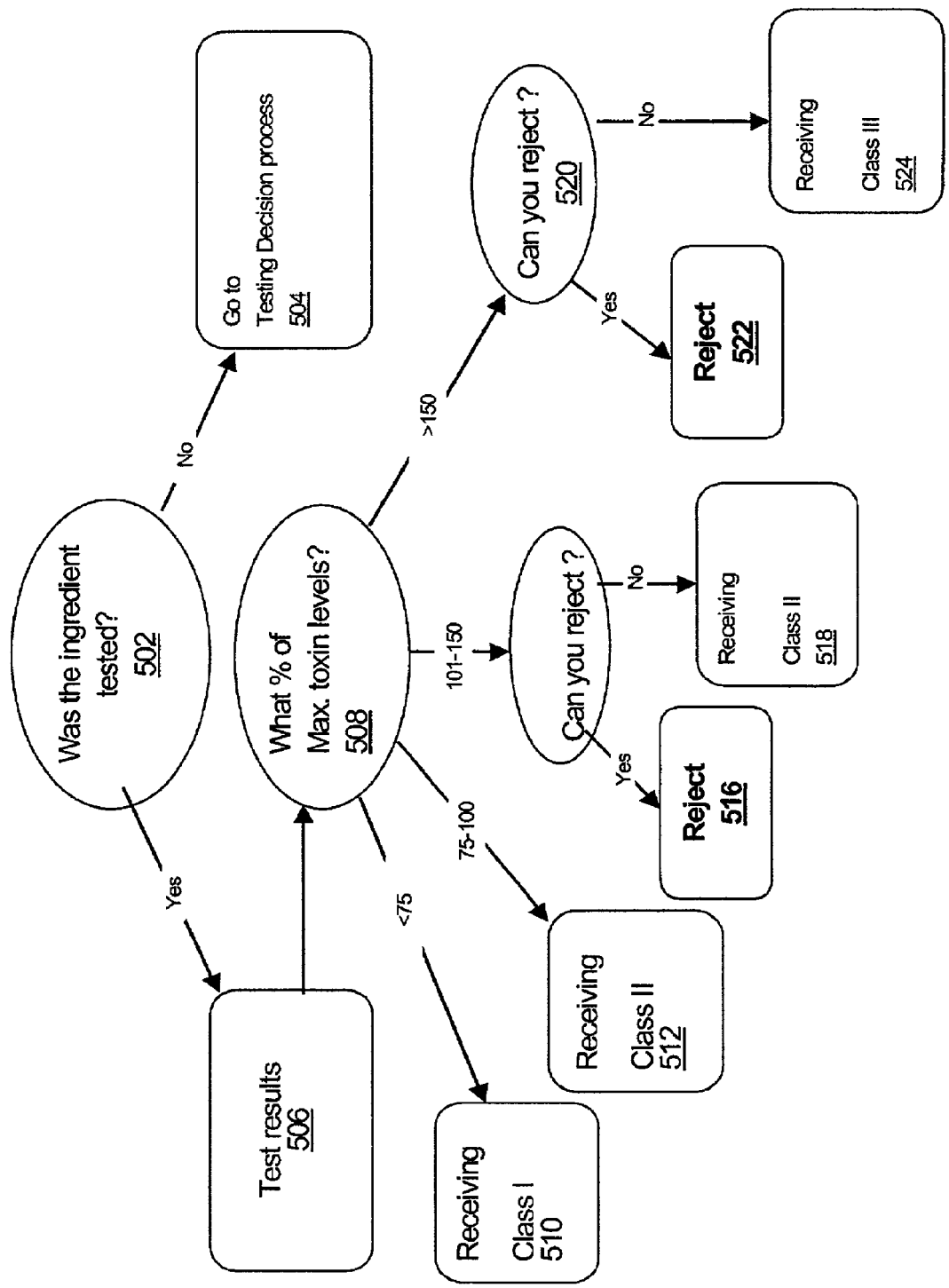
FIG. 5 illustrates a receiving decision process in accordance with an embodiment of the invention.

An exemplary receiving and classification process is shown in more detail in FIG. 5. If the ingredient has not yet been tested for the substances of interest (e.g., mycotoxin) at block 502, the process returns to the testing process as described above with respect to FIG. 4. If the ingredient has been tested and analyzed, at block 508 the test results (block 506) including the toxin content data are compared to the purchasing information, in particular, the maximum allowable toxin level. The test results may be provided by the user or stored in a database accessible to the user. Any test results provided by the user may be stored in a test results database. The stored test results may be used to develop trends that may then be used in connection with the various decision processes to determine the handling of future loads of an ingredient.

In the exemplary classification process shown in FIG. 5, the ingredient is classified based on the comparison of the test results and the maximum allowable toxin levels. Each classification has an associated set of storage information, such as recommended additives (e.g., inhibitors, binders etc.), and storage conditions. The storage information may be stored in a database accessible to the user. In the example shown, at block 510, if the mycotoxin levels in the ingredient are less than a first given percentage of the maximum allowable mycotoxin level, the ingredient is classified as Class I. For example, the first given percentage may be set to reflect a low toxin level. In FIG. 5 the first given percentage is 75%. If the mycotoxin levels in the ingredient are greater than the first given percentage but lower than a second given percentage of the maximum allowable mycotoxin level, at block 512 the ingredient is classified as Class II. For example, the second given percentage may be set to reflect a medium toxin level. In FIG. 5, the second given percentage is 100%. If the mycotoxin levels in the ingredient are greater than the second given percentage but lower than a third given percentage of the maximum allowable mycotoxin level, at blocks 514 and 516, it is determined whether the ingredient may be rejected. For example, the third given percentage may be set to reflect a high toxin level. In FIG. 5, the third given percentage is 150%. If the ingredient may not be rejected, at block 518 it is classified as Class II. If the mycotoxin levels in the ingredient are greater than the third given percentage of the maximum allowable mycotoxin level, at block 520, it is again determined whether the ingredient may be rejected. If the ingredient may not be rejected, it is classified as Class III.

Returning to FIG. 2, once the ingredient has been classified based in its toxin content data, a set of ingredient storage information associated with the classification of the ingredient is provided at block 208. As mentioned above, the ingredient storage information may include information such as recommended additives (e.g., inhibitors, binders etc.), and storage conditions In order to control and prevent mold growth and mycotoxin production, the ingredient should be stored in the proper environment. Storage conditions such as temperature, humidity and length of time of storage can effect mycotoxin production. In addition, additives, such as mold inhibitors may be added to the ingredient. There are numerous mold inhibitors known in the art. The ingredient storage information associated with each classification may be stored in a database.

Figure 6:
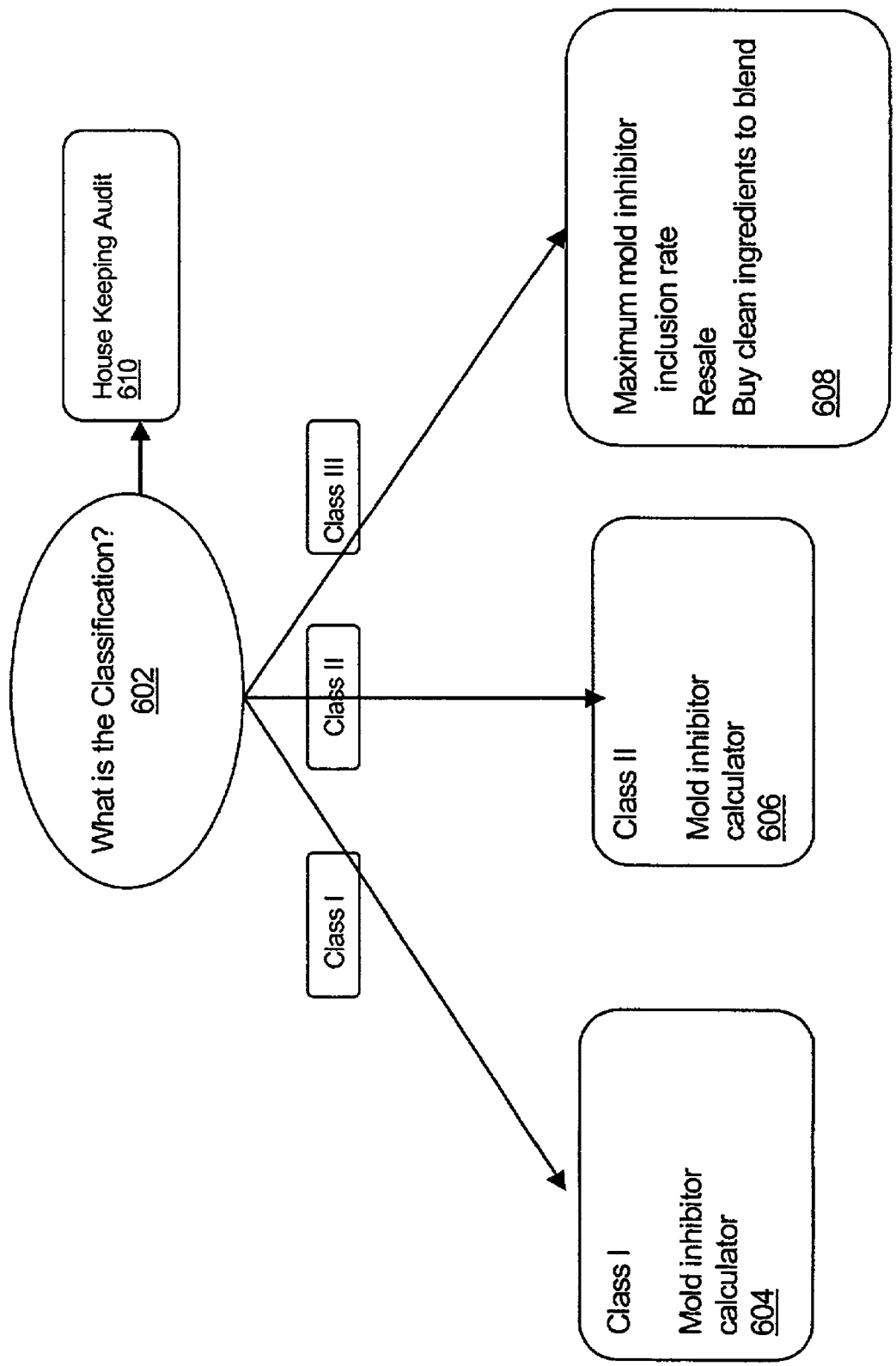
FIG. 6 illustrates a storage decision process in accordance with an embodiment of the invention.

An exemplary storage decision process is shown in more detail in FIG. 6. At block 602, the classification of the ingredient is used to identify the recommended storage information for the ingredient. As discussed above, the ingredient storage information may include information such as recommended additives (e.g., inhibitors, binders etc.), and storage conditions. At blocks 604 and 606, a calculation program or formula may be used to determine the proper amount of additive to included in the ingredient during storage. The proper amount of additive may be based on numerous factors such as the expected temperature of the storage facility, the expected relative humidity of the storage facility, the length of time of storage, a damaged ingredient percentage and the amount of moisture in the ingredient. In another embodiment, economic factors may also be considered in determining a recommended additive. For ingredients with high levels of mycotoxins (e.g., Class III), other possible strategies for handling of the ingredient (block 608) include reselling the ingredient or blending uncontaminated ingredients with the contaminated ingredient. The conditions at the feed plant and storage facility should be evaluated as well. A housekeeping audit may be performed at block 610 to determine whether the conditions of the storage facility and feed plant meet predetermined standards. The results of the housekeeping audit(s) may be stored in a database.

Returning to FIG. 2, at block 210, a set of ingredient use information is provided for the ingredient based on the toxin content data for the ingredient. The ingredient use information may include types of feed for which the ingredient would be appropriate, a formula or formula recommendations for feed incorporating the ingredient, including any additives, and whether the ingredient should be used at all. The ingredient use information may be stored in a database accessible to the user. The formula or formula recommendations may be determined using a feed formulation program, as discussed further below.

Figure 7:
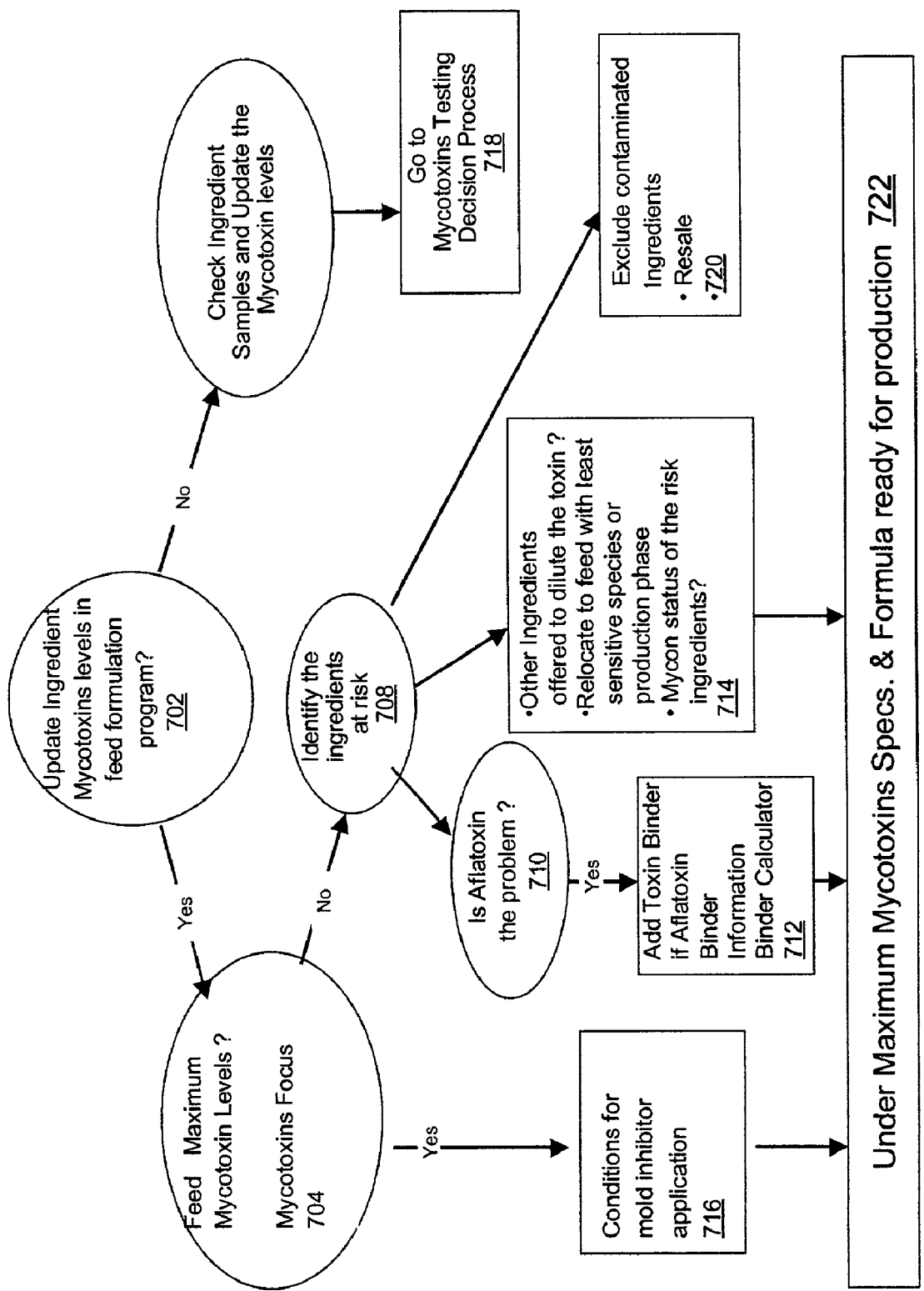
FIG. 7 illustrates a formulation decision process in accordance with an embodiment of the invention.

An exemplary formulation decision process is shown in detail in FIG. 7. The formulation process is used to provide a set of recommendations (e.g., ingredient use information) regarding the use of the ingredient or feed. A feed formulation program may be used to determine an appropriate formula for feed or recommendations for a feed formula incorporating the ingredient based on the toxin content data for the ingredient as well as feed specific information regarding maximum toxin levels and animal species toxin sensitivity. The feed formulation program may be a program specific to the user or the feed plant. In the alternative, a feed formulation program may be provided to the user by another source. At block 702, it is determined whether the toxin content levels have been updated for the feed formulation program. If the toxin content data has not been updated at block 706, the process returns to the testing decision process at block 718. If the toxin content data has been updated and the feed maximum toxin levels are known (block 704), the conditions for application of a mold inhibitor to the feed are identified based on the formulation at block 716. The feed maximum mycotoxin levels and ingredient and species specific information may be stored in a database accessible to the user.

If the feed maximum mycotoxin levels are not available or known, the ingredients at risk are identified at block 708. Mycotoxin binders are available for certain mycotoxins and may be added to the feed formula to prevent production of the mycotoxin at block 712. A calculation program or formula is provided at block 712 to determine the proper amount of binder to add to the ingredient or feed mixture. In one embodiment, economic factors may also be considered in determining a recommended toxin binder. Other strategies may be employed to determine the best use for an ingredient as shown in block 714. For example, other ingredients may be used to dilute the toxin or the feed incorporating the contaminated ingredient(s) may be directed to a feed for a species that is the least sensitive to the toxin. Information regarding the sensitivity of certain species to a toxin may be stored in a database accessible to the user. Another option, as shown in block 720, is to exclude the contaminated ingredients from any feed products.

Returning again to FIG. 2, the set of ingredient storage information and the set of ingredient use information is displayed at block 212. This information is provided as recommendations regarding the proper use and storage of the ingredient or feed. The recommendations may assist the user or feed plant with managing the risks associated with molds and toxins in feed ingredients and feed.

Figure 9:
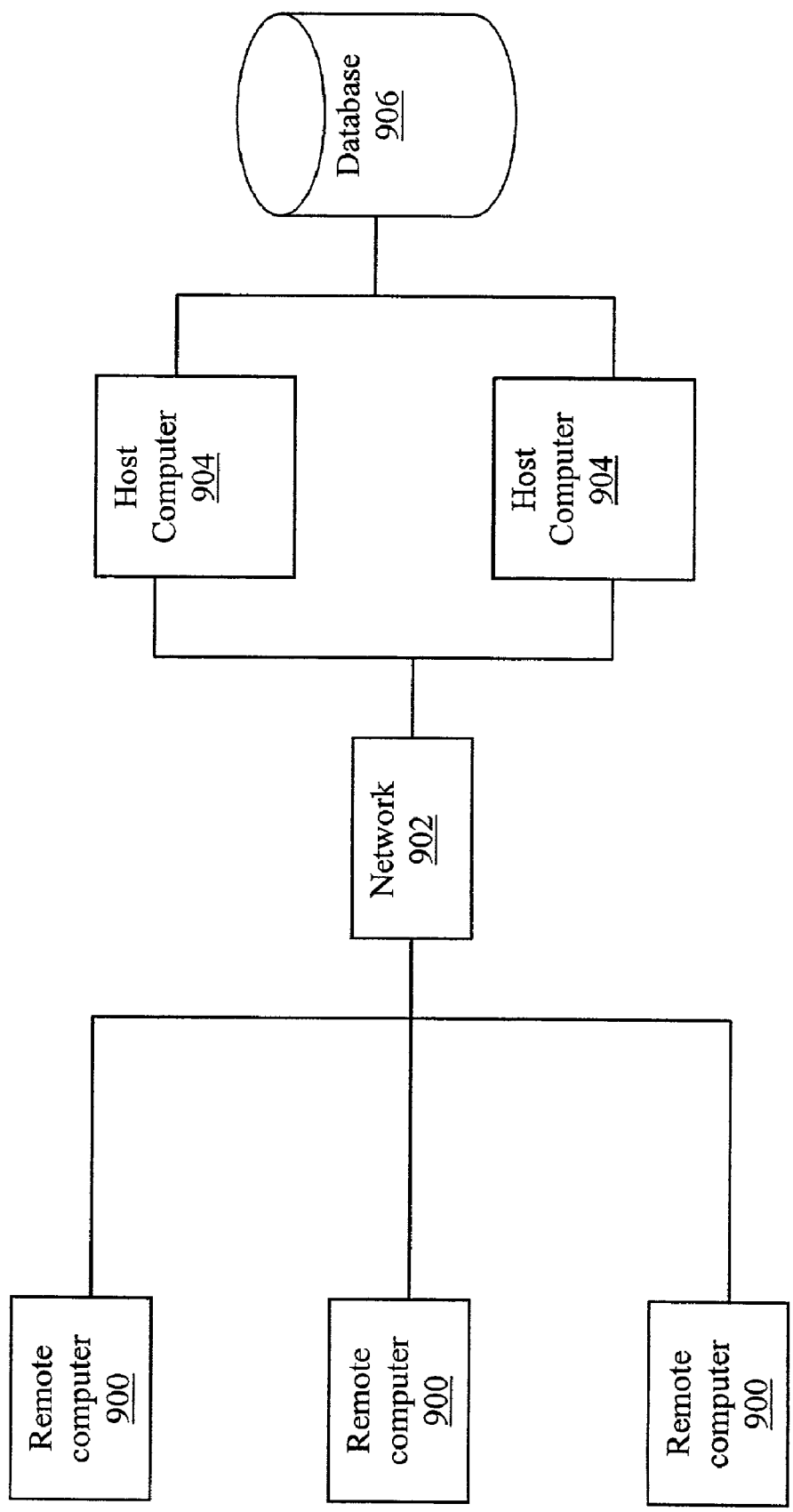
FIG. 9 is a diagram illustrating a system for providing toxin information and recommendations regarding ingredients over a computer network in accordance with an embodiment of the invention.

As mentioned previously, the systems, methods and apparatus described herein may be implemented on a computer as software or hardware. In addition, the system may be accessible via a computer network such as the World Wide Web. Referring to FIG. 9, a user may access the system via a remote computer 900 that is in communication over a network 902 with a plurality of host computers 904. Multiple users 900 may access the system over the network 902. The host computers 904 may be implemented as servers and are in communication with a digital storage medium 906 which stores (among other things), the various toxin, ingredient and feed information that is utilized by the system and the user as well as information that is received by the host computers 904 from a remote computer 900 over the network 904. The network 902 may be implemented as the Internet, in particular, the World Wide Web.

Figure 8A:
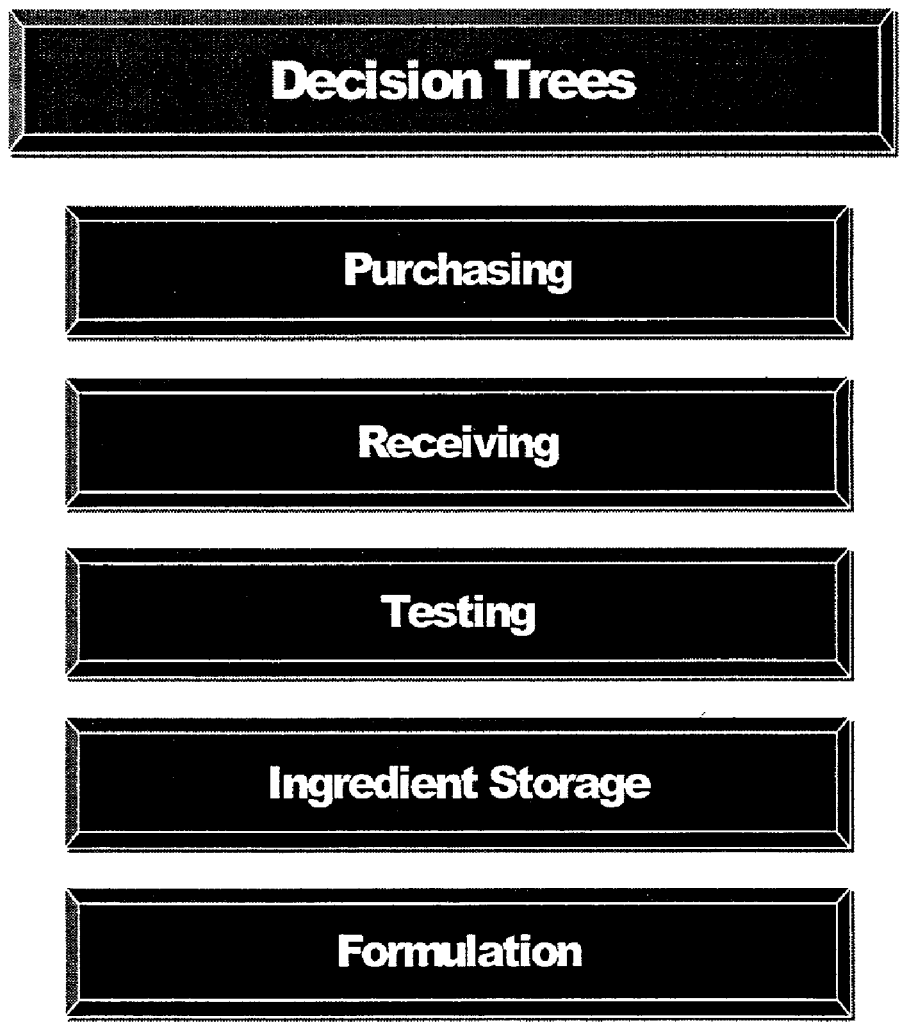
FIGS. 8a-8g show an exemplary user interface in accordance with an embodiment of the invention.

FIGS. 8a-8g illustrate an exemplary user interface in accordance with an embodiment of the invention. The user interface may be used to access a toxin management system that provides toxin information and recommendations regarding ingredients for feed. As discussed above, the system may be accessed via a computer network such as the World Wide Web. In FIG. 8a, a number of display regions are used to display a set of decision trees associated with various points in feed production. As shown in FIG. 8a, decision trees are provided regarding various points in the feed production process, namely, purchasing, receiving, testing, ingredient storage and formulation. As discussed above, the decision trees may be used to provide toxin information and recommendations. This information may be used to manage the risks associated with mold growth and mycotoxin production in feed ingredients and feed. A user may select a display region to view the steps of a particular decision tree.

Figure 8B:
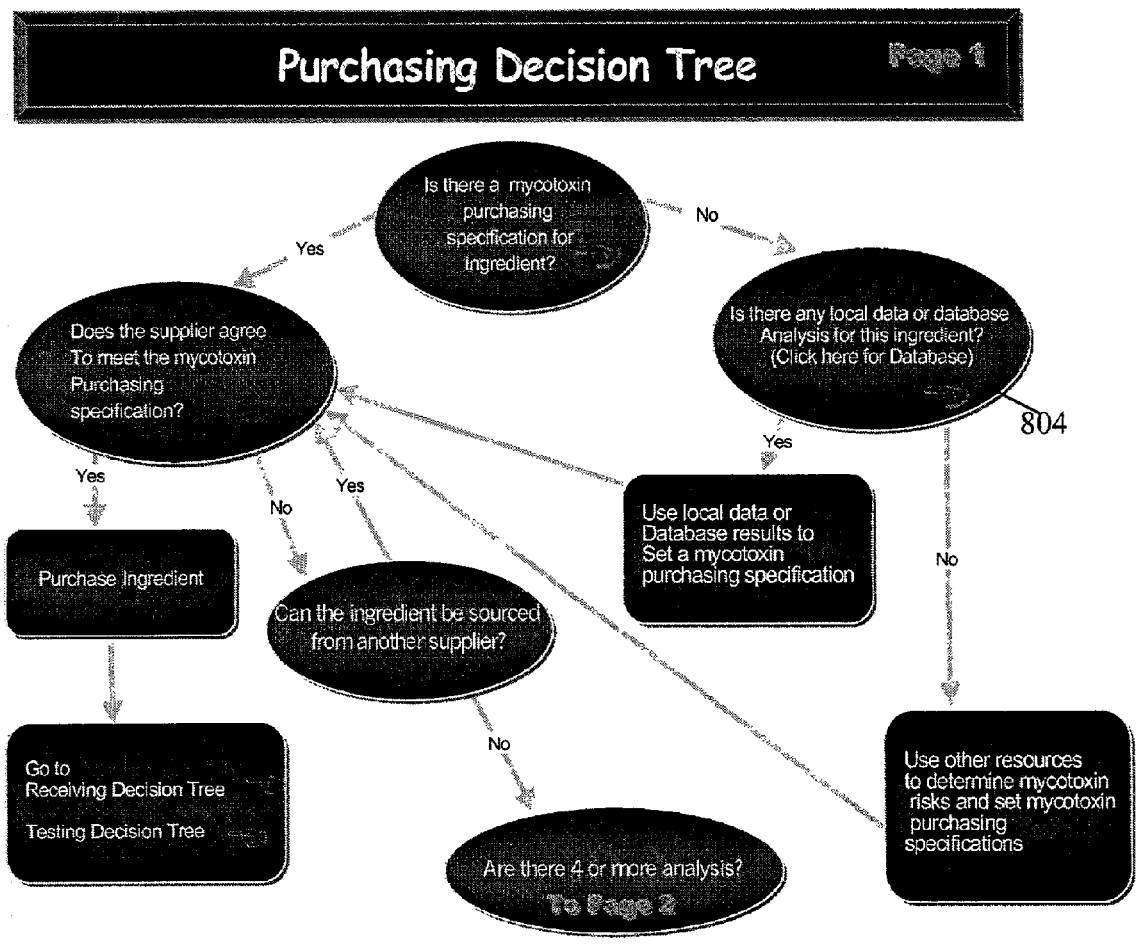
Figure 8C:
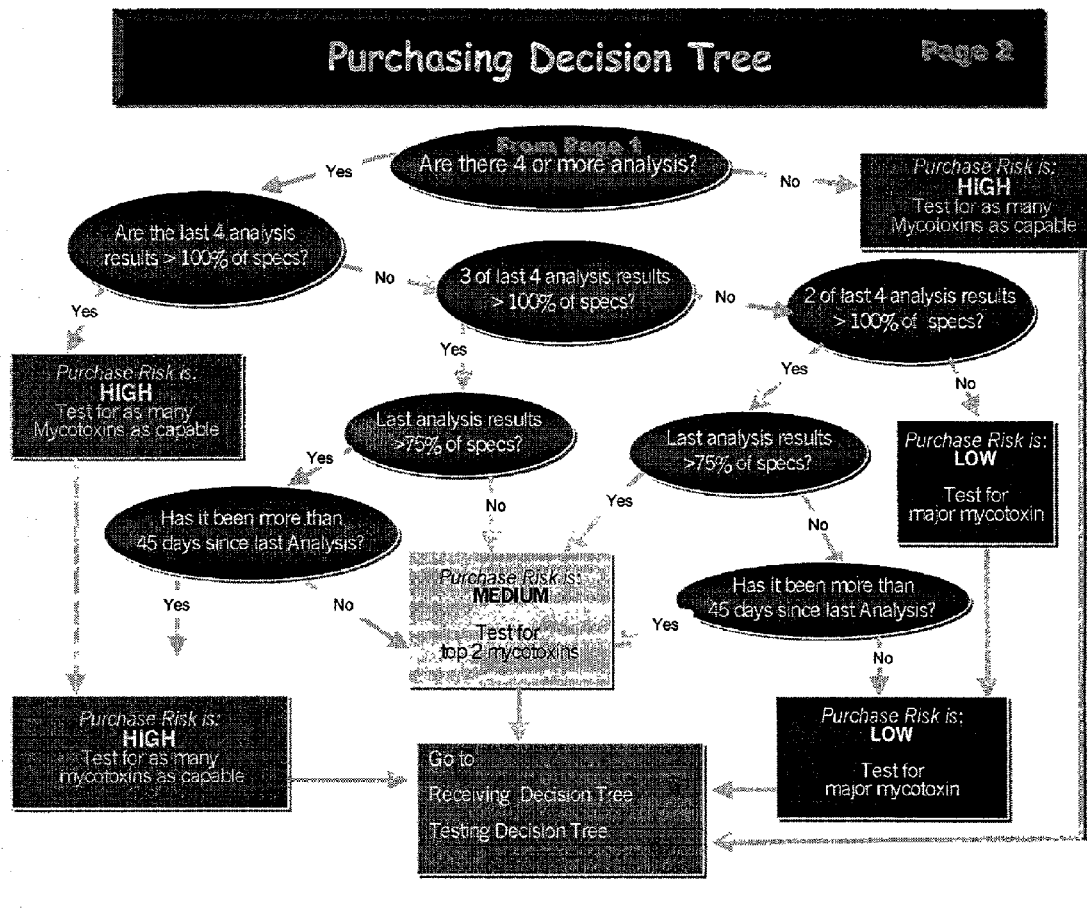
Figure 8D:
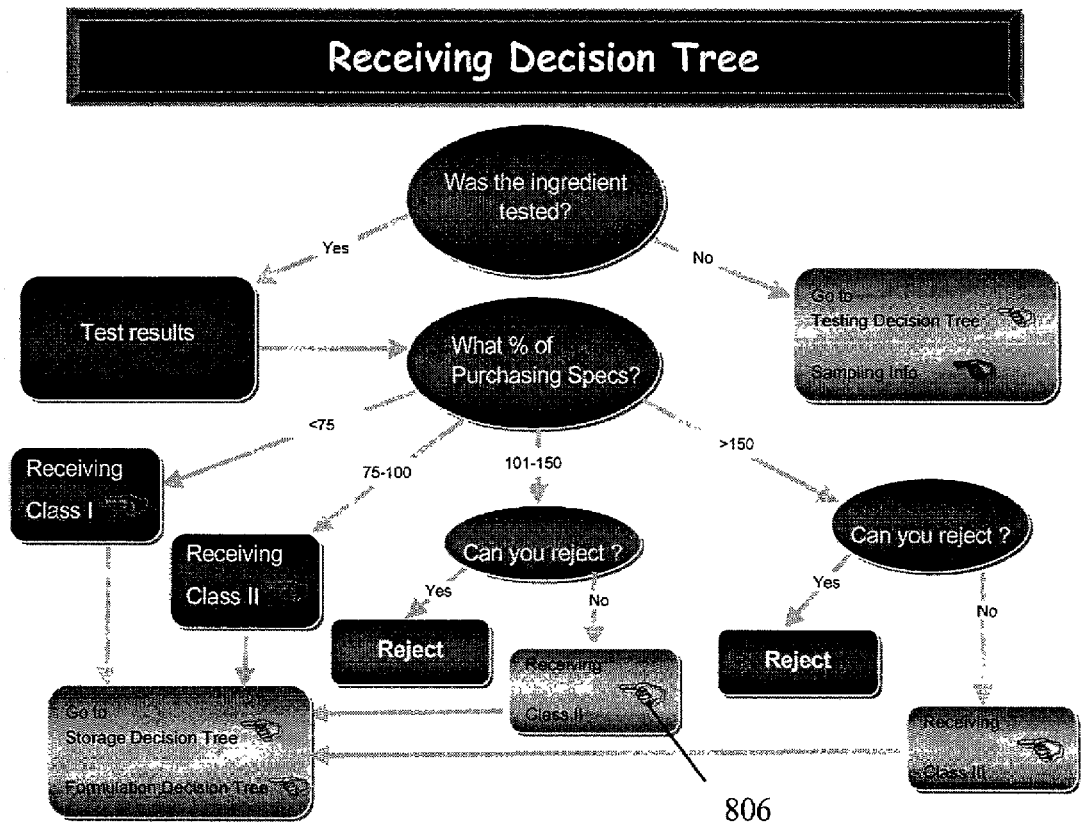

FIGS. 8b and 8c illustrate an exemplary user interface for a purchasing decision process including display regions that specify purchasing information, such as maximum allowable toxin levels for an ingredient. Links 804 are provided that are associated with stored information that is used in the decision process. The information can be stored locally or accessed via the World Wide Web. By selecting the link, the user may access the necessary information to drive the decision tree. As used herein, a link refers to any method of connecting or associating files and documents so that a user may access the files or document by selecting the link. The links in the user interface may be associated with a site that may provide access to updated reference information. FIG. 8d illustrates an exemplary user interface for a receiving decision process including a display region that specifies a classification for an ingredient. The user interface for the receiving decision process also includes links 806 to stored information associated with steps in the decision process.

Figure 8E:
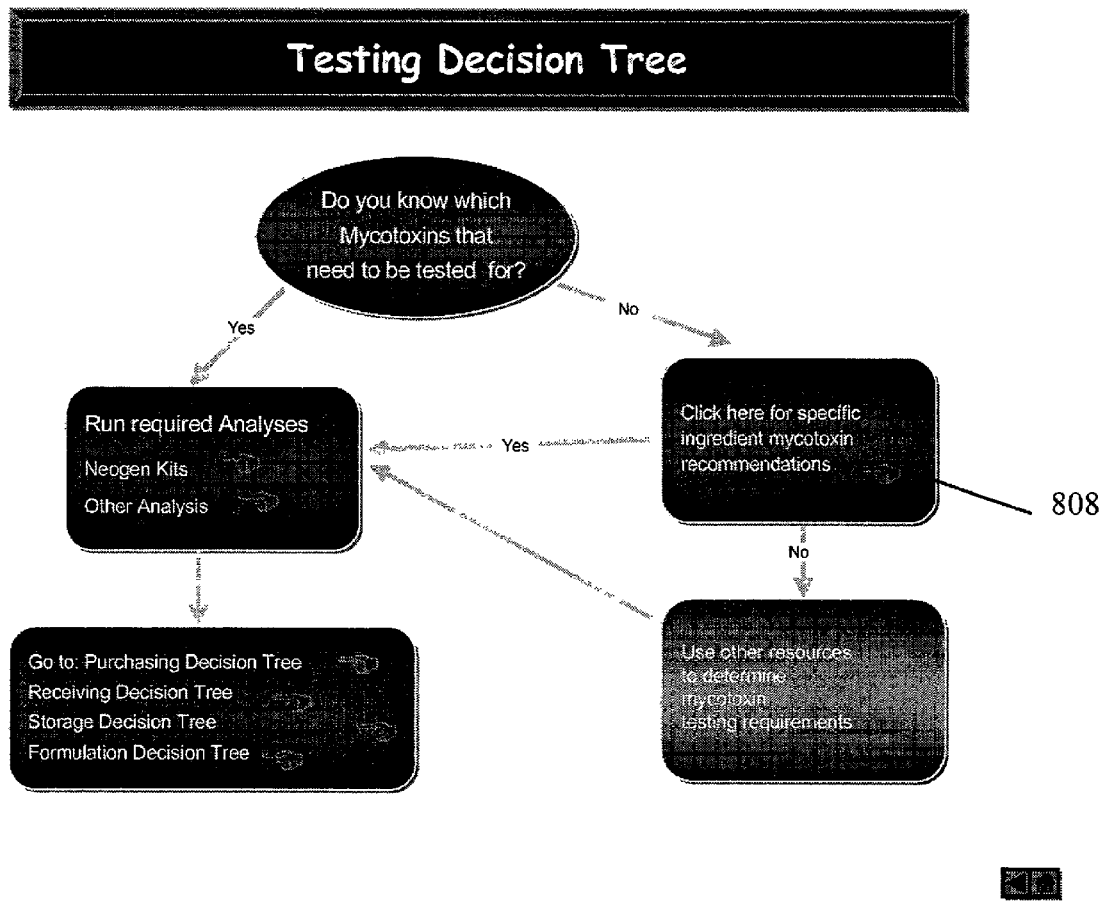
Figure 8F:
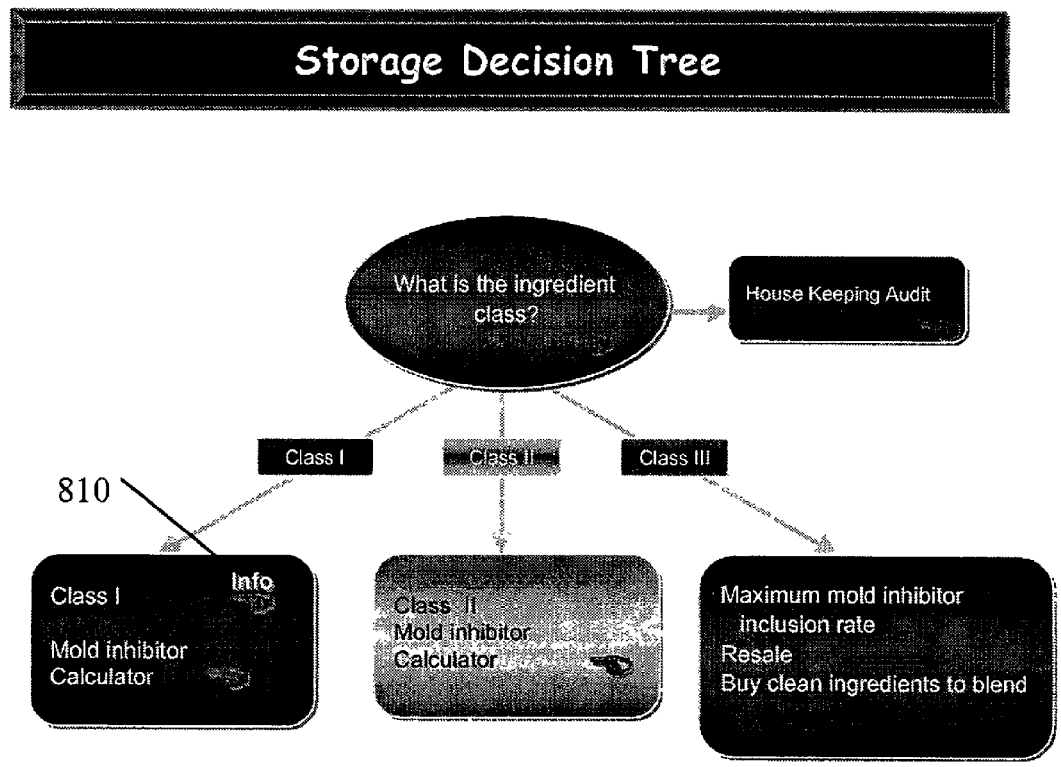

FIG. 8e illustrates an exemplary user interface for a testing decision process including display regions to specify a set of toxins for which to test in the ingredient and to specify a set of toxin content data for an ingredient. In addition, the testing user interface includes a display region that notifies a user of a test type associated with the ingredient and the toxins present in the ingredient. The testing user interface further includes links 808 to stored information associated with the steps of the decision process. FIG. 8f illustrates an exemplary user interface for a storage decision process including a display region to specify a set of ingredient storage information for an ingredient. The storage user interface further includes links 810 to stored information associated with the steps of the decision process.

Figure 8G:
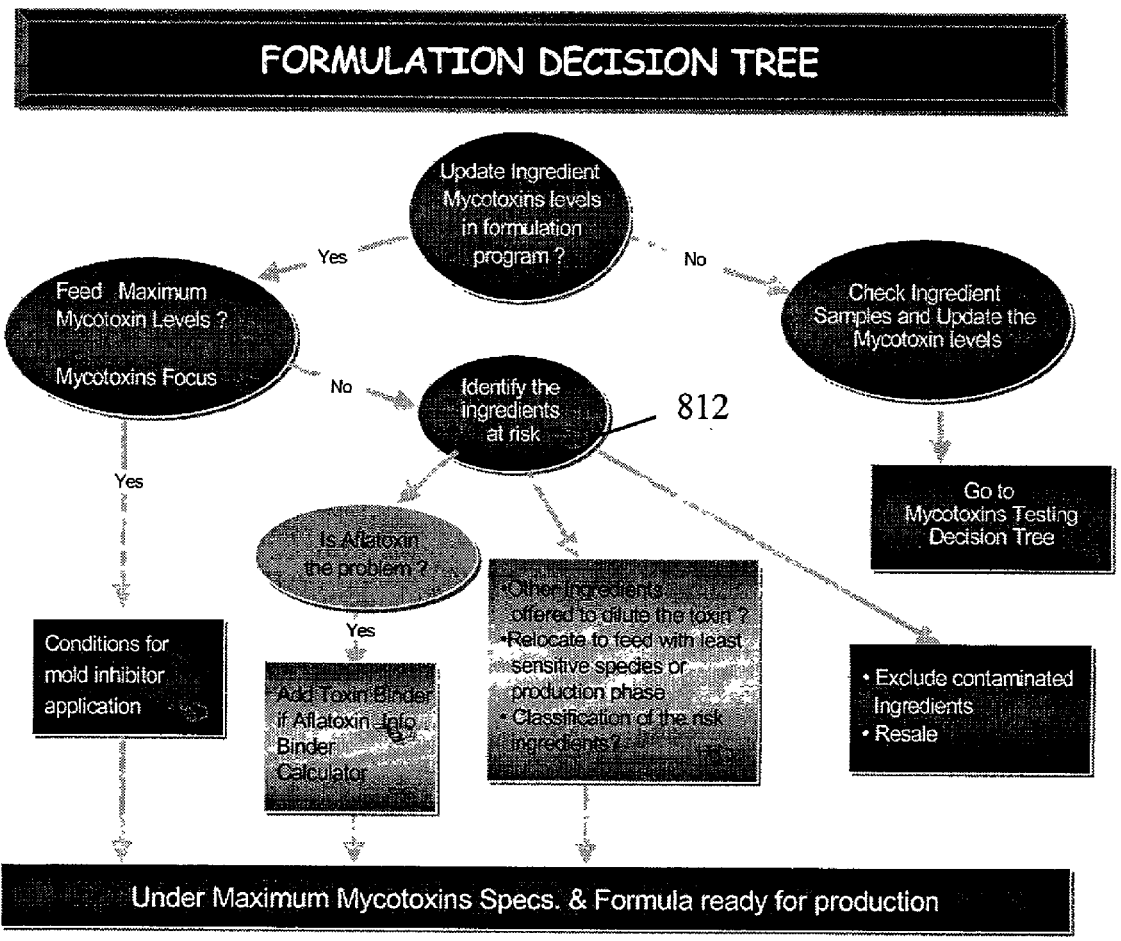

FIG. 8g illustrates an exemplary user interface for a formulation decision process including a display region that specifies a set of ingredient use information for an ingredient or feed. The formulation user interface further includes links 812 to stored information associated with the steps of the decision process. The formulation interface may be associated with a formulation program that may be used to determine an appropriate formula for feed or recommendations for a feed formula incorporating the ingredient based on the toxin content data for the ingredient as well as feed specific information regarding maximum toxin levels and animal species toxin sensitivity. The feed formulation program may be a program specific to the user or the feed plant. In the alternative, a feed formulation program may be provided to the user by another source.

Figure 10:
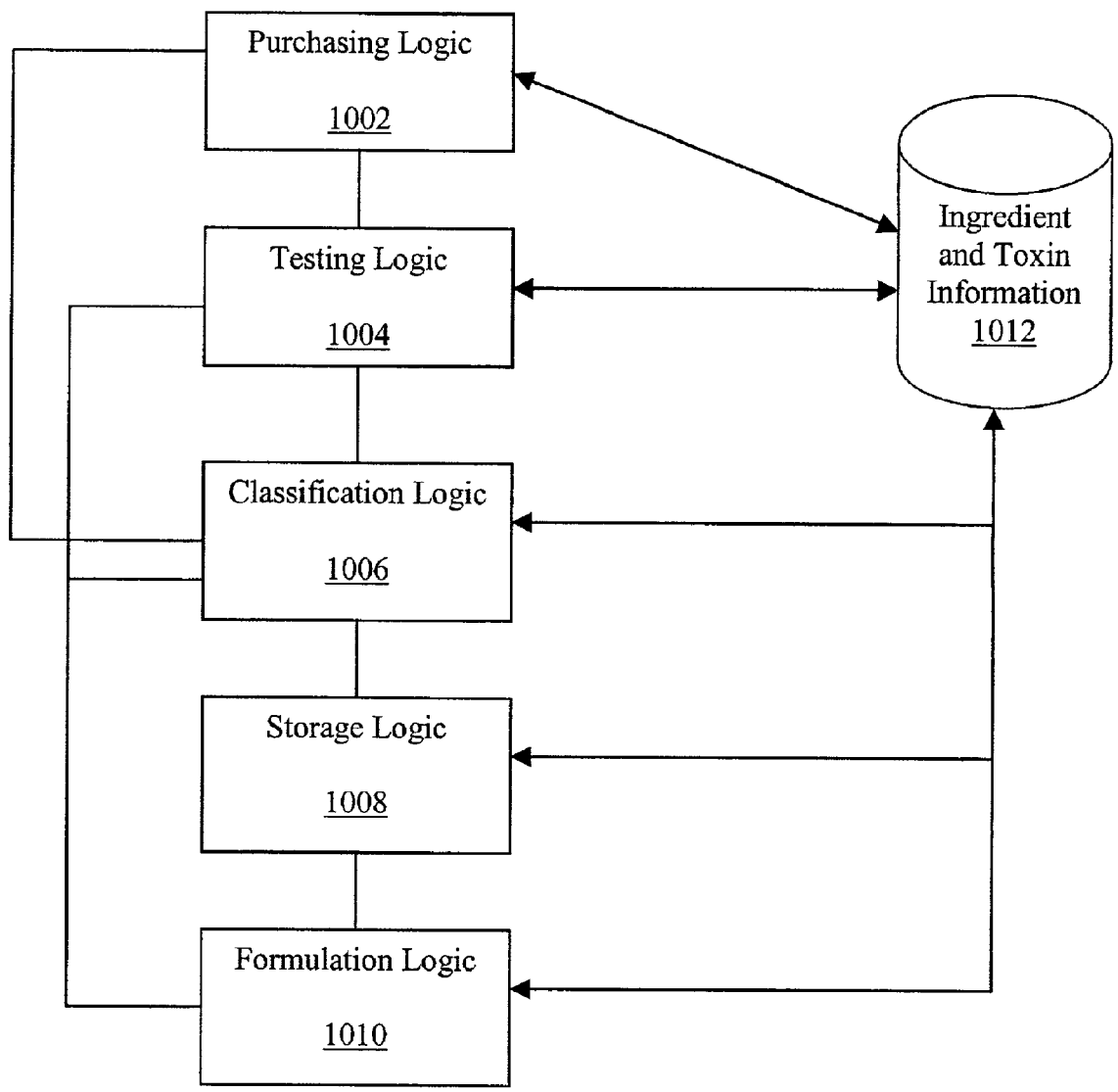
FIG. 10 is a block diagram of an apparatus used to provide toxin information and recommendations regarding ingredients used in feed in accordance with an embodiment of the invention.

FIG. 10 is a block diagram of an apparatus used to provide toxin information and recommendations regarding ingredients used in feed in accordance with an embodiment of the invention. Purchasing logic 1002 is used to receive a set of purchasing information for at least one ingredient. As discussed above with respect to FIG. 2, the purchasing information may be provided by the user or stored in a database 1012 coupled to the purchasing logic 1002. The user may determine the purchasing information by accessing the database 1012, by conducting research or by contacting a resource. Any purchasing information provided by the user from research or other resources may be stored in a database 1012 so it may be accessed by other users. The purchasing information may include information regarding, for example, the allowable toxin levels for a particular feed ingredient or feed mixture.

Testing logic 1004, coupled to the purchasing logic, is used to receive a set of toxin content data for the at least one ingredient. The toxin content data includes, for example, a type and amount for a set of toxins in the ingredient. The toxin content data for an ingredient is determined by sampling and testing a portion of the ingredient lot to determine the toxins present in the ingredient. Testing logic 1004 is coupled to database 1012 that includes information regarding recommended testing procedures and kits for various mycotoxins. In addition, the toxin content data acquired from the testing may also be stored in database 1012. Therefore, testing logic 1004 may receive the test results from database 1012. In an alternative embodiment, a user may provide the test results directly to the testing logic.

Classification logic 1006, coupled to the testing logic 1004, is used to classify the at least one ingredient based on the toxin content data and the purchasing information (e.g. maximum allowable toxin levels). The classification may be used to identify the ways in which the ingredient received by the feed plant should be stored and used. Proper storage of an ingredient or feed can reduce the possibility of continued mold growth and mycotoxin production. Preferably, the classification logic compares the toxin content data received by the testing logic 1004 and the maximum allowable toxin levels received from the purchasing logic to determine the classification of the ingredient. Each classification has associated storage information, such as recommended additives (e.g., inhibitors, binders etc.), and storage conditions. The storage information may be stored in database 1012, coupled to the classification logic 1006.

Storage logic 1008 coupled to the classification logic 1006 is used to provide and display ingredient storage information regarding the ingredient. As discussed above, the ingredient classification is associated with ingredient storage information. The ingredient storage information may include information such as recommended additives (e.g., inhibitors, binders etc.), and storage conditions In order to control and prevent mold growth and mycotoxin production, the ingredient should be stored in the proper environment. Storage conditions such as temperature, humidity and length of time of storage can effect mycotoxin production. In addition, additives, such as mold inhibitors may be added to the ingredient. There are numerous mold inhibitors known in the art. The ingredient storage information associated with each classification may be stored in database 1012.

Formulation logic 1010, coupled to the classification logic 1006 and the testing logic 1004, is used to provide and display ingredient use information regarding the ingredient. The ingredient use information may include types of feed for which the ingredient would be appropriate, a formula for feed or recommendation for a feed formula incorporating the ingredient, including any additives, and whether the ingredient should be used at all. The ingredient use information may be stored in database 1012. The ingredient use information provided is based on factors such as the toxin content data for the ingredient as well as feed specific information regarding maximum toxin levels and animal species sensitivity. The formulation logic may include a feed formulation program that may be used to determine an appropriate formula for feed or recommendations for a feed formula incorporating the ingredient based on the toxin content data for the ingredient as well as feed specific information regarding maximum toxin levels and animal species toxin sensitivity. Alternatively, the formulation logic may receive inputs from a feed formulation program. The feed formulation program may be a program specific to the user or the feed plant. In the alternative, a feed formulation program may be provided to the user by another source.

Figure 11:
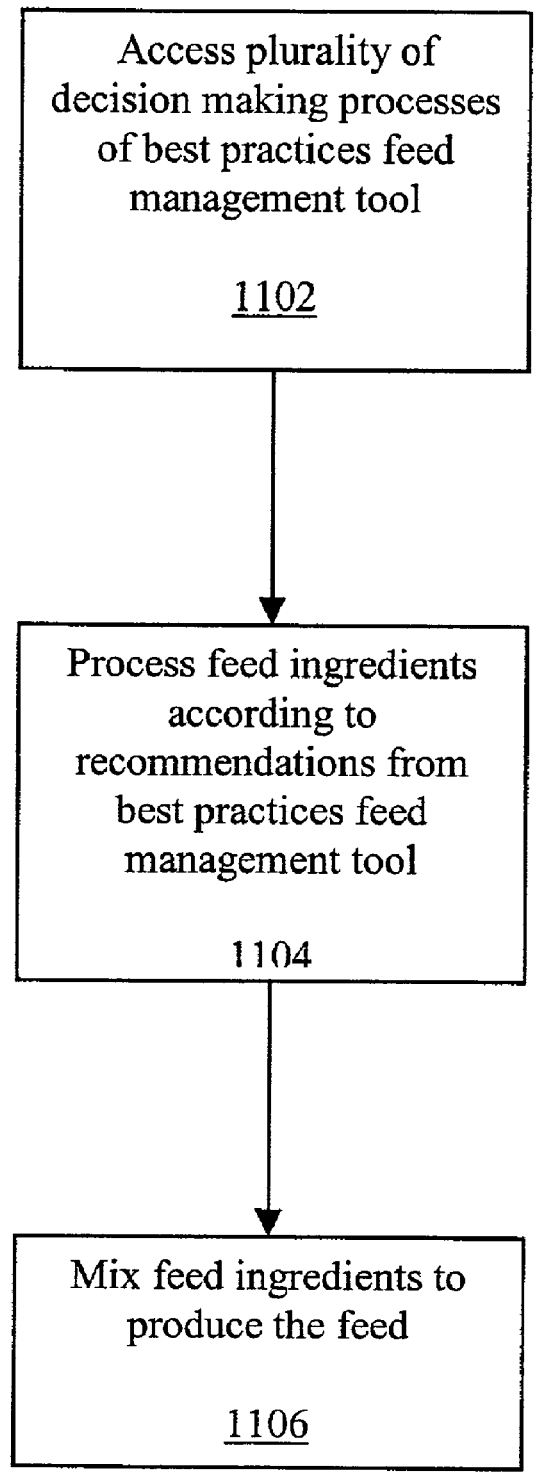
FIG. 11 illustrates a method of manufacturing feed in accordance with an embodiment of the invention.

FIG. 11 illustrates the logical flow of a method of manufacturing feed in accordance with an embodiment of the invention. Toxin information and recommendations may be used to guide the processing and production of feed so as to manage the risks presented by various substance present in feed ingredients such as mycotoxins. A plurality of decision making processes are provided as part of a best practices feed management tool. The best practices feed management tool may be for example, a method or apparatus as described herein. The decision processes are preferably a set of decision trees regarding various points in feed production where toxins in feed ingredients and feed may be evaluated and controlled. As discussed previously, it is advantageous to take steps to control substances such as mold and mycotoxins during feed production. At block 1102, the plurality of decision making processes of the best practices feed management tool are accessed, for example, a user may access the tool via a network or as a program implemented on a computer. The decision processes may relate to feed production steps such as purchasing, receiving, testing, ingredient storage and formulation. The information output by the various decision processes is used to process the feed ingredients at block 1104. Information provided by the decision processes may include ingredient storage information and ingredient use information. At block 1106, the feed ingredients are mixed to produce the feed according to the recommendations provided by the decision processes of the best practices feed management tool.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for providing ingredient information for formulation of feed and risk assessment of the feed formulation, the method comprising:

receiving by the computer toxin content data including toxin content testing data for at least one ingredient, the toxin content data including a type and an amount for toxins in the at least one ingredient;

classifying by the computer the at least one ingredient based on the toxin content data and a predetermined allowable toxin amount for the at least one ingredient;

generating by the computer a feed formulation based on the toxin content data, including determining whether the toxin content amount for at least one ingredient has been updated, determining a feed formulation maximum toxin content level, and determining a type and an amount of an additive for the feed formulation based at least in part on a comparison of the toxin content level for at least one ingredient and the feed maximum content level;

identifying by the computer the risk of using the feed formulation;

providing by the computer the feed formulation and risk assessment of the feed formulation to a user; and deciding by the user whether to accept or reject the ingredient based on the risk assessment information and the feed formulation information.

2. A method according to claim 1, further including displaying by the computer questions to the user to direct the user through a plurality of decision making steps regarding the at least one ingredient.

3. A method according to claim 1, further including displaying by the computer questions to the user to direct the user through a plurality of decision making steps regarding a toxin.

4. A method according to claim 1, further including allowing the user to select a link to reference information.

5. A method according to claim 4, further including displaying by the computer reference information.

6. A method according to claim 4, wherein the reference information includes at least one from the set comprising toxin information, ingredient information and feed information.

7. A method according to claim 1, wherein classifying the ingredient includes comparing the toxin content data to the predetermined allowable toxin amount for the at least one ingredient.

8. A method according to claim 1, further including allowing the user to select a link to information pertaining to maximum allowable levels for a set of toxins.

9. A method according to claim 8, further including displaying by the computer the information pertaining to the maximum allowable levels for the set of toxins.

10. A method according to claim 1, wherein receiving by the computer toxin content data includes receiving the toxin content data from a second computer connected to the computer over a network.

11. A method for providing toxin information regarding ingredients used in feed to a user, the method comprising:

receiving by the computer toxin content data including testing data for at least one ingredient, the toxin content data including a type and an amount of toxins in the at least one ingredient;

classifying by the computer the at least one ingredient based on the toxin content data and a predetermined allowable toxin amount for the at least one ingredient;

generating a feed formulation based on the toxin content data, including determining whether the toxin content amount for at least one ingredient has been updated, determining a feed formulation maximum toxin content level, and determining a type and an amount of an additive for the feed formulation based at least in part on a comparison of the toxin content level for at least one ingredient and the feed maximum content level;

identifying by the computer the risk of using the feed formulation;

providing by the computer the feed formulation and risk assessment of the feed formulation to a user;

providing by the computer recommended uses; and deciding by the user whether to accept or reject the at least one ingredient.

12. A method according to claim 11, wherein displaying ingredient use information includes determining by the computer a type of feed in which to incorporate the at least one ingredient.

13. A method according to claim 11, wherein recommended uses include type of animal for the feed.

14. A method according to claim 11, wherein displaying ingredient use information includes determining more than one recommendations for a formula for the manufacture of the feed using the at least one ingredient.

15. A method according to claim 11, further including displaying by the computer questions to the user to direct the user through a plurality of decision making steps regarding the at least one ingredient.

16. A method according to claim 11, further including displaying by the computer questions to the user to direct the user through a plurality of decision making steps regarding a toxin.

17. A method according to claim 11, further including allowing the user to select a link to reference information.

18. A method according to claim 17, further including displaying by the computer reference information.

19. A method according to claim 17, wherein the reference information includes at least one from the set comprising toxin information, ingredient information and feed information.

20. A method according to claim 11, wherein classifying the at least one ingredient includes comparing the toxin content data to the predetermined allowable toxin amount for the at least one ingredient.

21. A method according to claim 11, further including allowing the user to select a link to information pertaining to maximum allowable levels for a set of toxins.

22. A method according to claim 21, further including displaying by the computer the information pertaining to the maximum allowable levels for the set of toxins.

23. The method according to claim 11, wherein providing by the computer recommended uses includes transmitting the recommended uses to a second computer connected to the computer over a network.

24. A method of providing recommendations regarding a set of ingredients used in feed to a user, comprising:

displaying by the computer steps of a decision process to the user;

promoting user inputs by the computer;

receiving by the computer operator inputs including those pertaining to toxin content from toxin content testing data of the set of ingredients in response to questions asked in the steps of the decision process;

processing by the computer the operator inputs in accordance with decision process logic stored in a digital storage medium to generate the recommendations, the processing including determining a feed formulation maximum toxin content level, and determining ingredient additive information including a type and an amount of an additive for the feed formulation based at least in part on a comparison of the toxin content testing data for at least one ingredient and the feed maximum content level;
providing by the computer the recommendations to the user based on the receiving and processing steps, the recommendation including at least one of feed formulation, ingredient additive information, storage information, and risk assessment information; and
utilizing the recommendation to make an ingredient accept or reject decision.

25. A method according to claim 24, further including allowing the user to select a link to information pertaining to maximum allowable levels for a set of toxins.

26. A method according to claim 24, further including displaying the information pertaining to the maximum allowable levels for a set of toxins.

27. The method according to claim 24, wherein providing by the computer the recommendations including at least one feed formulation includes transmitting the recommendations to a second computer connected to the computer over a network.

28. An apparatus for providing toxin information regarding ingredients used in feed to a user, the apparatus comprising:
purchasing logic that receives a predetermined allowable toxin amount for at least one ingredient;
testing logic, coupled to the purchasing logic, that receives a set of toxin content data for the at least one ingredient, the toxin content data including a type and an amount of toxins in the at least one ingredient;
classification logic, coupled to the purchasing logic and the testing logic, that classifies the at least one ingredient based on the toxin content data and the predetermined allowable toxin amount for the at least one ingredient;
storage logic, coupled to the classification logic, that displays ingredient storage information regarding the at least one ingredient based on the classification of the at least one ingredient;
formulation logic, coupled to the testing logic and classification logic, that displays ingredient use information regarding the at least one ingredient based on the toxin content data for the at least one ingredient, the ingredient use information generated by
determining whether the toxin content data for at least one ingredient has been updated,
determining a feed formulation maximum toxin content level, and
determining a type and an amount of an additive for the feed formulation based at least in part on a comparison of the toxin content data for at least one ingredient and the feed maximum content level;
risk assessment logic, coupled to the testing logic and classification logic, that displays risk assessment for the ingredient and for the feed formulation; and
decision logic that prompts a user to make a decision to accept or reject the ingredient.

29. An apparatus according to claim 28, the decision logic further including displaying questions to the user to direct the user through a plurality of decision making steps regarding the at least one ingredient.

30. An apparatus according to claim 28, the decision logic further including displaying questions to the user to direct the user through a plurality of decision making steps regarding a toxin.

31. An apparatus according to claim 28, further including a link that allows the user to access reference information.

32. An apparatus according to claim 31, wherein the reference information includes at least one from the set of toxin information, ingredient information and feed information.

33. An apparatus according to claim 28, wherein classifying the at least one ingredient includes comparing the toxin content data to the predetermined allowable toxin amount for the at least one ingredient.

34. An apparatus according to claim 28, wherein displaying the ingredient use information includes determining a type of feed in which to incorporate the at least one ingredient.

35. An apparatus according to claim 28, wherein displaying the ingredient use information includes determining a formula for the manufacture of the feed using the at least one ingredient.

36. An apparatus according to claim 28, wherein displaying the ingredient use information includes determining recommendations regarding a formula for the manufacture of the feed using the at least one ingredient.

37. An apparatus according to claim 28, further including a link that allows the user to access information pertaining to maximum allowable levels for a set of toxins.

38. The apparatus according to claim 28, further including a user interface configured to allow a user to utilize one or more of the purchasing logic, the testing logic, the classification logic, the storage logic, the formation logic, the risk assessment logic and the decision logic from a remote computer in communication with the apparatus over a network.

39. A system for providing toxin information regarding ingredients used in feed to a user, the system comprising:
a first process, running on a host computer receiving by the computer toxin content data for at least one ingredient, the toxin content data including a type and an amount for toxins in the at least one ingredient;
a second process, running on a host computer classifying the at least one ingredient based on the toxin content data and a predetermined allowable toxin amount for the at least one ingredient;
a third process, running on a host computer generating a feed formulation based on the toxin content data including
determining whether the toxin content data for at least one ingredient has been updated,
determining a feed formulation maximum toxin content level, and
determining a type and an amount of an additive for the feed formulation based at least in part on a comparison of the toxin content data for at least one ingredient and the feed formulation maximum content level;
a fourth_process, running on a host computer identifying by the computer the risk of using the feed formulation;
a fifth process, running on a host computer providing the feed formulation and risk assessment of the feed formulation to a user; and
a sixth process, running on a host computer prompting deciding by the user whether to accept or reject the ingredient based on the risk assessment information and the feed formulation information.

40. The system of claim 39, wherein generating a feed formulation based on the toxin content data further includes
determining whether the received toxin content for at least one ingredient is associated with a toxin binder,
determining a type and an amount of toxin binder to be added to the feed formulation based on the amount of the ingredient in the feed formulation, and
regenerating the feed formulation based on the type and amount of the toxin binder.

41. The system of claim 40, wherein identifying by the computer the risk of using the feed formulation further includes determining a risk level associated with each ingredient included in the feed formulation at least in part by analyzing the toxin content data to identify factors that are indicative of the risk of toxin development, determining a risk level associated with each ingredient included in the feed formulation at least in part by determining whether the test results of at least one previous toxin test were greater than a defined percentage, assigning a risk level for ingredients not associated with toxin content data, and generating the risk of using the feed formulation based on the risk level associated with the ingredients in the feed formulation.

\* \* \* \* \*

UNITED STATES PATENT AND TRADEMARK OFFICE
CERTIFICATE OF CORRECTION

PATENT NO. : 7,827,037 B2  Page 1 of 1
APPLICATION NO. : 10/170241
DATED : November 2, 2010
INVENTOR(S) : James Z. Yi et al.

It is certified that error appears in the above-identified patent and that said Letters Patent is hereby corrected as shown below:

On the face page, in field (75), in "Inventors", in column 1, line 2, delete "Gary D. Fisher" and insert -- Gary D. Fischer --, therefor.

On the face page, in field (75), in "Inventors", in column 1, line 3, delete "Frank Yin" and insert -- Frank L. Jin --, therefor.

In Page 2, in "Other Publications", in Column 1, line 11, delete "p. 66(11)" and insert -- p. 68(11) --, therefor.

In column 6, line 18, before "block" insert -- At --.

Signed and Sealed this
Twenty-fifth Day of January, 2011

David J. Kappos
*Director of the United States Patent and Trademark Office*